US012230876B1

(12) United States Patent
Wrigley et al.

(10) Patent No.: US 12,230,876 B1
(45) Date of Patent: Feb. 18, 2025

(54) INTEGRATED MICROWAVE RADIO FREQUENCY FEED NETWORK

(71) Applicant: Lockheed Martin Corporation, Bethesda, MD (US)

(72) Inventors: Jason Stewart Wrigley, Littleton, CO (US); Erik Lier, Phoenixville, PA (US); Timothy Patrick Wink, Castle Rock, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 285 days.

(21) Appl. No.: 18/053,113

(22) Filed: Nov. 7, 2022

(51) Int. Cl.

| | |
|---|---|
| ***H01Q 1/50*** | (2006.01) |
| *H01P 1/161* | (2006.01) |
| *H01P 1/207* | (2006.01) |
| *H01P 5/20* | (2006.01) |

(52) U.S. Cl.
CPC ............... *H01Q 1/50* (2013.01); *H01P 1/161* (2013.01); *H01P 1/207* (2013.01); *H01P 5/20* (2013.01)

(58) Field of Classification Search
CPC ........ H01P 1/161; H01P 1/2131; H03H 7/461
See application file for complete search history.

(56) References Cited

U.S. PATENT DOCUMENTS

| | | | | |
|---|---|---|---|---|
| 8,198,955 | B2 * | 6/2012 | Reiche | H01P 1/161 333/125 |
| 8,878,629 | B2 * | 11/2014 | Gehring | H01P 1/2133 343/756 |
| 9,478,838 | B2 | 10/2016 | Wolf et al. | |
| 10,320,085 | B1 | 6/2019 | Lier et al. | |
| 10,749,252 | B1 | 8/2020 | Lier et al. | |
| 2005/0104791 | A1 | 5/2005 | Sun et al. | |
| 2013/0342282 | A1 * | 12/2013 | Uher | H01P 1/161 333/135 |
| 2016/0315382 | A1 * | 10/2016 | Katase | H01P 1/161 |
| 2021/0257740 | A1 * | 8/2021 | Cartaillac | H01Q 15/0026 |

OTHER PUBLICATIONS

Bornemann, Jens et al., "Septum Polarizer Design For Antenna Feeds Produced By Casting," IEEE Antennas and Propagation Society International Symposium 1997, 4 pages, Jul. 13-18, 1997.
Chen, Yen-Lin et al., "A 77-118 GHz Resonance-Free Septum Polarizer," The Astrophysical Journal Supplement Series, vol. 211, No. 11, 11 pages, Mar. 2014.
Esteban, Jaime et al., "Field Theory C.A.D. Of Septum OMT-Polarizers," IEEE Antennas and Propagation Society International Symposium 1992, 4 pages, Jun. 18-25, 1992.
(Continued)

*Primary Examiner* — Quan Tra

(57) ABSTRACT

Provided herein are various enhancements for waveguide structures used in radio frequency feed components. In one example, an apparatus includes a septum polarizer having first feed ports and a common port, a high-pass filter coupled to the common port of the septum polarizer, and a multi-port orthomode transducer (OMT) coupled to the high-pass filter and providing an antenna port. The apparatus also includes hybrid couplers coupled to low-pass filters fed from the multi-port OMT, and magic tee elements cross-coupled to the hybrid couplers and providing second feed ports.

20 Claims, 9 Drawing Sheets

(56) References Cited

OTHER PUBLICATIONS

Jazani, Ghoncheh et al., "Design Of Dual-Polarized (RHCP/LHCP) Quad-Ridged Horn Antenna With Wideband Septum Polarizer Wave Guide Feed," IET Microwaves, Antennas & Propagation, vol. 12, Iss. 9, pp. 1541-1545, 2018.
Microwaves101, "Double-Ridged Waveguide," https://www.microwaves101.com/encyclopedias/double-ridged-waveguide, 3 pages, Oct. 5, 2021.
Ordek, Sezgin et al., "Horn Array Antenna Design For Ku-Band Applications," 2015 9th International Conference on Electrical and Electronics Engineering, pp. 351-354, Nov. 26-28, 2015.
Silver, Samuel, "Microwave Antenna Theory And Design," First Edition, 10.15 The Box Horn,, pp. 377-380, 1949.
Vettikalladi, Hamsakutty et al., "High Gain And High Efficient Stacked Antenna Array With Integrated Horn For 60 GHz Communication Systems," International Journal of Antennas and Propagation, vol. 2014, 9 pages, Apr. 22, 2014.
Young, Leo et al., "Meander-Line Polarizer," IEEE Transactions on Antennas and Propagation, pp. 376-378, May 1973.
Zhang, J. C. et al., "Multifunctional Meander Line Polarizer," Progress in Electromagnetics Research Letters, vol. 6, pp. 55-60, 2009.

* cited by examiner

MANUFACTURED VIEW

VIEW OF AIR CAVITIES ON SQUARE LATTICE

INTEGRATED MICROWAVE RADIO FREQUENCY FEED NETWORK

TECHNICAL BACKGROUND

Microwave radio frequency (RF) transmission and receiving systems are employed across a wide range of application areas, including satellite communications, terrestrial telecommunications, wireless data transmission, telemetry, surveillance, remote sensing and control, among other application areas. Often, RF transmit/receive circuitry is employed in concert with various waveguide-based feed components which couple to aperture antenna elements. Aperture antennas are a form of RF antenna used for directed transmission and reception of various RF signals, often employed in direct-radiated arrays or in reflector antenna feed systems. Antenna feed components can include orthomode transducers (OMTs), polarizers, filters, couplers, and the like. When large quantities of aperture antennas are desired, such as in electronically steered arrays (ESAs), designing and assembling RF waveguide-based feed solutions between RF circuitry and radiative components presents many challenges. These challenges can be especially pronounced when high-density and low-profile arrays are desired.

Often, separate receive and transmit arrays with distinct feed components and antenna apertures are employed due to the challenges of integration and manufacturing. However, these approaches suffer from large stackup dimensions, misalignment issues, potentially asymmetric mating forces, and unwanted RF losses, especially when large arrays of concurrent connections are required. Waveguides and associated RF feed elements can be difficult to design and manufacture due in part to the high sensitivity of waveguides to manufacturing precision, symmetry, and geometric configurations which can lead to distortions like passive intermodulation (PIM). Moreover, the waveguide structures themselves can have bandwidth limitations related to corresponding geometries and manufacturing techniques. Thus, manufacturability and density of packaging are two areas that can be very challenging when trying to maintain performance in arrayed microwave RF systems.

Overview

Feed networks for microwave RF systems, such as for horn antennas in electronically steered arrays (ESAs), are provided which include integrated and compact waveguide structures for concurrent receive (Rx) and transmit (Tx) functionality. These enhanced dual polarization feed networks include several integrated Tx and Rx waveguide cavity structures folded back over one another to position Tx/Rx feed ports on an opposite longitudinal end of the feed structures from antenna ports. With this arrangement, the feed networks discussed herein provide high bandwidth performance in a compact packaging envelope. Example frequency ranges include concurrent (dual) Tx/Rx operation in the Ka microwave band of 26.5-40 gigahertz (GHz), although other frequency ranges can be supported.

In one example, an apparatus includes a septum polarizer having first feed ports and a common port, a high-pass filter coupled to the common port of the septum polarizer, and a multi-port orthomode transducer (OMT) coupled to the high-pass filter and providing an antenna port. The apparatus also includes hybrid couplers coupled to low-pass filters fed from the multi-port OMT, and magic tee elements cross-coupled to the hybrid couplers and providing second feed ports.

In another example, a method of manufacturing a radio frequency feed structure is provided. The method includes forming a first assembly and a second assembly and joining the first assembly and the second assembly to form a joined cavity. The first assembly comprises a first unified cavity having a septum polarizer with first feed ports and a common port, a first segment of a high-pass filter coupled to the common port of the septum polarizer, first segments of hybrid couplers; and magic tee elements comprising difference ports providing second feed ports, sum ports, and co-linear ports cross-coupled to the first segments of the hybrid couplers. The second assembly comprises a second unified cavity having a second segment of the high-pass filter, second segments of the hybrid couplers, low-pass filters coupled to second segments of the hybrid couplers, an antenna port, and a multi-port orthomode transducer (OMT) coupled to the second segment of the high-pass filter, the low-pass filters, and the antenna port.

In yet another example, a waveguide cavity structure includes a septum polarizer with first feed ports and a common port, a high-pass filter coupled to the common port of the septum polarizer, and a multi-port orthomode transducer (OMT) coupled to the high-pass filter and providing an antenna port. The waveguide cavity structure also includes hybrid couplers coupled to low-pass filters fed from the multi-port OMT, and magic tee elements cross-coupled to the hybrid couplers and providing second feed ports and sum ports.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Enhanced microwave radio frequency (RF) transmission and receiving systems and components are presented herein.

Specifically, RF feed networks or structures can be employed between RF transmit/receive circuitry and antenna elements. These feed networks include waveguide cavity-based structures that perform various functions with regard to transiting RF energy and signals. Example components that comprise these structures include orthomode transducers (OMTs), polarizers, high-pass or low-pass filters, couplers, magic tees, and the like. Waveguides and associated structures/cavities can be difficult to design and manufacture due in part to the high sensitivity of waveguides to manufacturing precision, symmetry, and geometric configurations which can lead to distortions like passive intermodulation (PIM). The examples herein present compact, integrated waveguide structures that form dual-band concurrent transmit/receive feed networks.

Figure 1:
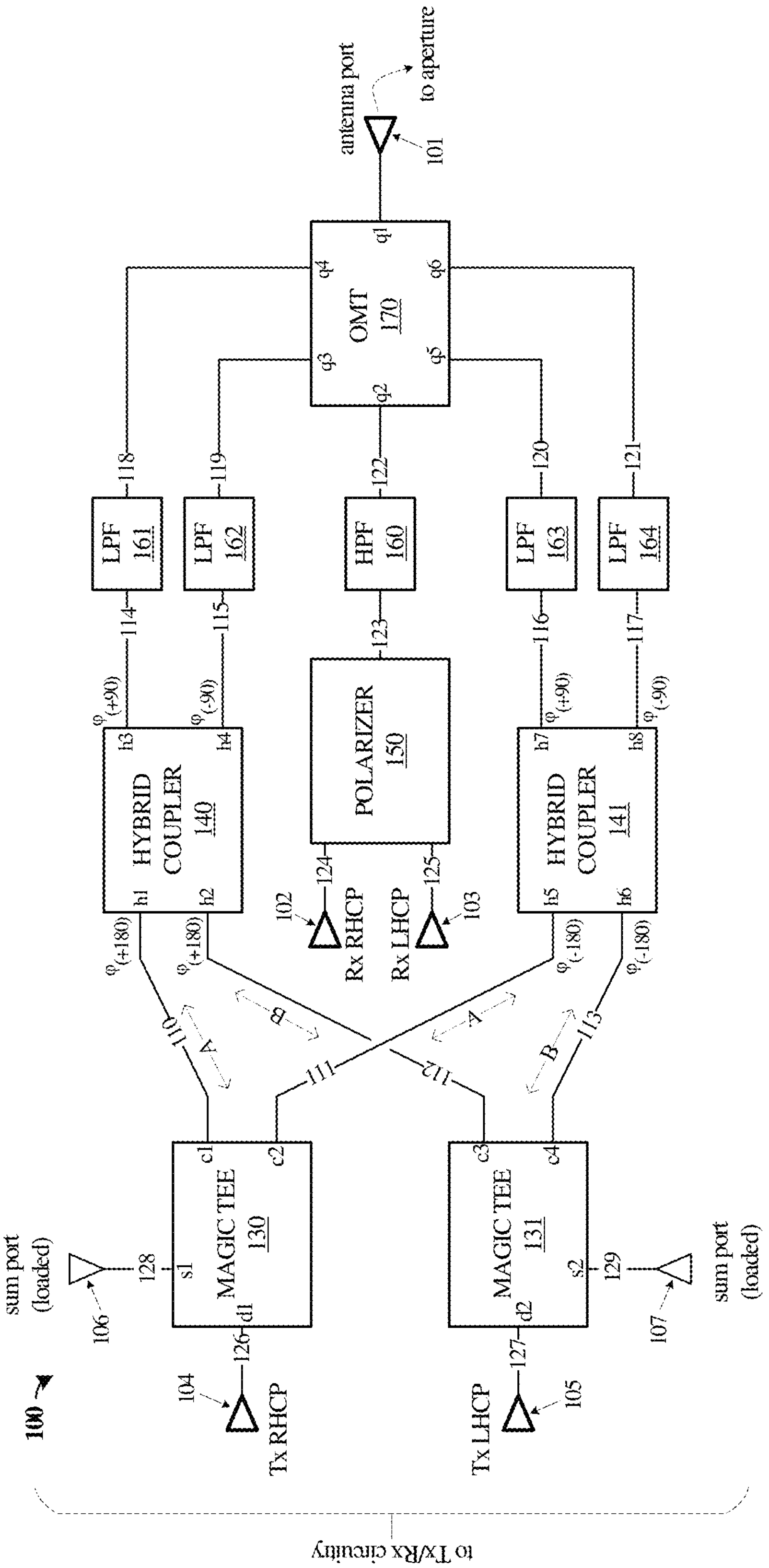
FIG. 1 illustrates a schematic view of a radio frequency feed in an implementation.

A first example implementation of an RF feed network is presented in FIG. 1. FIG. 1 includes system 100 comprising an RF feed network having various RF waveguide-based components that couple between RF transmit/receive circuitry and an antenna element, such as an aperture antenna. Examples of aperture antennas include horn antennas, and these aperture antenna elements might directly transmit/receive RF energy or be coupled to various reflectors, dish elements, parabolic reflectors, and the like. In FIG. 1, an aperture antenna can be coupled to antenna port 101. Various components and mounting hardware might be included between antenna port 101 and antenna elements, including flanges, chokes, or disconnects. These elements are omitted for clarity in FIG. 1.

A Tx pathway and an Rx pathway are included in system 100. The Tx pathway accepts right-hand circular polarization (RHCP) and left-hand circular polarization (LHCP) transmit signals at feed ports 104-105 into difference ports on magic tees 130-131 via links 126-127. Outputs of magic tees 130-131 provide phase-shifted and power-split versions of these transmit signals over four Tx branches comprising links 110-113. From here, links 110-113 provide input signals to hybrid couplers 140-141. Hybrid couplers 140-141 combine similarly phase-shifted transmit signal pairs into a set of further phase shifted and power-split versions at links 114-117. For magic tees 130-131 the Tx signals experience a 180 degree phase shift, and for hybrid couplers 140-141 the Tx signals experience a 90 degree phase shift. Both the magic tees and the hybrid couplers also split power equally among the output signals. In this manner, the Tx signals of each of the four branches represent a quarter of the total power at the input to orthomode transducer (OMT) 170. Two of the four branches are shifted 90 degrees in phase relative to the other two branches. OMT 170 then establishes a circularly polarized transmit signal by summing or combining these four Tx branch signals. The circularly polarized transmit signal is then provided for transmission to a remote node by way of antenna port 101 an any corresponding aperture antenna element.

Four Tx branches can provide a larger operating bandwidth and better phase alignment in OMT 170 than fewer branches, such as two branches. For example, a four Tx branch configuration seen in FIG. 1 can provide for 17.70 to 21.2 GHz operation. In contrast, a two Tx branch configuration might provide 20.2 to 21.2 GHz operation, but have a smaller packaging envelope with fewer branches to route. To provide for the enhanced Tx/Rx bandwidth, the circular waveguide comprising OMT 170 is sized larger in a four-branch configuration to support operation down to 17.70 GHz. In this configuration, waveguide modes exist up at 31 GHz. In order to avoid launching these unwanted modes, such as TE21, a more symmetrical mating arrangement to OMT 170 is provided with four Tx branches. Advantageously, four Tx recombination ports on OMT 170, rather than two, can provide for enhanced operation including a desired axial ratio over wider Rx and Tx bands.

For the receive (Rx) network of system 100, a less complex arrangement is provided, as compared to the Tx network. In this example, a two-branch Tx arrangement can provide for Rx frequency operation of 30.0 to 31.0 GHZ, while a four-branch Tx arrangement can provide for Rx frequency operation of 27.50 to 31.0 GHZ. This wider frequency range can be due to the larger cross-section of the circular waveguide forming OMT 170 to support four Tx branches, as noted above. From OMT 170, receive signals are blocked from back-propagation into the Tx branches by low-pass filters (LPFs) 161-164 and instead propagate through high-pass filter (HPF) 160 to polarizer 150. Polarizer 150 provides RHCP and LHCP receive signals to Rx ports 102-103. A more detailed discussion on the operation and elements of the various components in FIG. 1 are provided below.

Turning now to a detailed discussion of the components of FIG. 1, system 100 includes magic tee elements 130-131, hybrid couplers 140-141, polarizer 150, high-pass filter 160, low-pass filters 161-164, and orthomode transducer (OMT) 170. As mentioned, antenna port 101 can be coupled to further components, such as aperture antennas (not shown). Various internal links 110-123 couple the various elements of system 100 as shown. Although discrete links 110-123 are shown in the schematic representation of FIG. 1, in physical assemblies these links can comprise the same waveguide cavities, or extensions thereof, comprising the elements of FIG. 1. Thus, elements 130-131, 140-141, 150, 160-164, and 170 can form a combined waveguide cavity or airspace volume along with links 110-123.

Input/output feed ports 102-105 (as well as load ports 106-107) can be coupled to external systems (not shown). These external systems can be coupled via coaxial links or waveguide structures. Similarly, load ports 106-107 can be coupled via coaxial links or waveguide structures to load elements, such as impedance elements. When coaxial links are employed, coaxial connectors can be coupled to the ports, such as threaded, press-fit, bayonet, or other coaxial connector types. These coaxial connectors can have various RF launch features to couple a coaxial conduction-based signal medium to the propagating volume formed by system 100, which may comprise pin-like features of various shapes and sizes to couple center conductors of corresponding coaxial links into the volume of feed ports 102-105 for emission/reception of signals to/from the coaxial links. When waveguide links are employed instead of coaxial links, various flange and bolt arrangements can be established for feed ports 102-105 that couple to standardized waveguide conduits, such as WR-34 or other waveguide types.

The Tx/Rx labels in FIG. 1 illustrate an example having receive circuitry coupled to feed ports 102-103 and transmit circuitry is coupled to feed ports 104-105. In other examples, transmit circuitry can be coupled to feed ports 102-103 and receive circuitry can be coupled to feed ports 104-105. Thus, the elements of system can be employed on either end of a two-endpoint communication link, such as one endpoint comprising a ground station and another endpoint comprising an orbital satellite. Other configurations of endpoints are possible, depending on location, positioning, movement, and selected frequency bands or ranges. Thus, system 100 illustrates a dual band feed network which supports concurrent transmit and receive operations. The dual band operation includes a first frequency band for transmit signaling and a second frequency band for receive signaling. For instance, one example includes the full bandwidth of the Institute of Electrical and Electronics Engineers (IEEE) RF microwave K/Ka band, namely a Tx band of 17.70 to 21.20 GHz and an Rx band of 27.50 to 31.00 GHZ. Additionally, two transmit and two receive ports are provided such that orthogonal polarizations are supported for each transmit and receive mode. In FIG. 1, these polarizations are labeled as RHCP, referring to right-hand circular polarization, and LHCP, referring to left-hand circular polarization. Other polarization schemes might be employed, and both polarizations need not be coupled to associated circuitry.

Example frequency ranges for system 100 include various RF bands capable of transiting RF waveguide structures. Different frequency bands can be supported by a similar architecture shown in FIG. 1, with associated geometry scaling to suit the selected frequency ranges. While the examples herein cover portions of the K band noted above, other examples might include the Ka band or Ku band or other portions of the K bands (approximately 12 to 40 GHz), or X band (approximately 8 to 12 GHZ). Other examples might be configured to support a frequency range corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations.

Turning now to a discussion on the individual elements of system 100, a receive (Rx) pathway can be employed to transfer received RF signals from antenna port 101 to RX feed ports 102-103. This Rx pathway includes antenna port 101, OMT 170, high-pass filter (HPF) 160, polarizer 150, feed ports 102-103, and various links 122-125.

OMT 170 comprises a six-port OMT in this example, with six individual waveguide ports included. In some examples, OMT 170 can instead be referred to as a front quadrature junction (QJ). Orthomode transducers (OMTs) act as duplexers which separate or combine orthogonal (e.g., vertical and horizontal) signal polarizations among different ports with respect to a common or shared port. In this example, the common port can be antenna port 101, a second port comprises link 122 for Rx signals, and a set of four ports comprise links 118-119 for Tx signals. OMT 170 combines/separates these signals with respect to antenna port 101 to support concurrent Tx/Rx operations at antenna port 101 and by system 100. The combined Tx/Rx signal at port 101 is separated by OMT 170 based on signal polarization among the respective Tx/Rx ports. While many OMTs might have a single port for Tx and a single port for Rx, this example includes one port for Rx and four ports for Tx. Additionally, low-pass filters 161-164 and high-pass filter 160 can be employed to further isolate Tx and Rx signals based on frequency.

High pass filter (HPF) 160 comprises a waveguide cavity having a selected geometry and length configured to support propagation of signals only above a certain frequency. Thus, HPF 160 can block back-propagation of Tx signals into the Rx network when appropriate frequency bands are selected among Tx and Rx signals. Signals having a lower frequency than the cutoff frequency of HPF 160 are generally blocked or impeded such that polarizer 150 receives only signals above the cutoff frequency of HPF 160. This isolation for lower frequency signals below the cutoff frequency can be expressed in a decibel (dB) drop in power. Thus, polarizer 150 receives an Rx signal over link 123 which has had low-frequency components largely removed by HPF 160.

Polarizer 150 can comprise a septum style of polarizer. Polarizers can be employed in microwave feed networks which convert polarizations of signals between linear and circular polarizations, and vice-versa. Linear vertical (or linear horizontal) polarization typically refers to a single electromagnetic signal propagating in a single plane along the direction of propagation, while circular polarization includes two linear components that are perpendicular to each other and having a phase difference of 90° (π/2). Other polarizations are possible, such as elliptical. A septum OMT-polarizer includes a conductive ‘septum’ which spans through a waveguide at a midplane, dividing a waveguide cavity having a common or shared port at one end (e.g., at link 123) into two ports at the other end (e.g., feed ports 102-103 fed by links 124-125). The septum can employ a geometry having a series of stepped discontinuities to convert a circularly polarized signal received at the common input port of the OMT-polarizer into two linear polarization signals at two output ports of the OMT-polarizer. Thus, feed ports 102-102 have orthogonal polarizations (RHCP, LHCP) provided by polarizer 150. Conversion of polarizations of signals in such communication systems can enable more effective communications between endpoints having varied or unpredictable relative orientations. For example, it can be helpful to use circular polarization to communicate from a satellite to ground stations, aircraft, or vehicles.

Turning now to the transmit (Tx) pathway, also referred to as a transmit network, four (4) low pass filters, two (2) hybrid h-wall couplers, and two (2) magic tees are included. In terms of the elements of system 100, this Tx network includes feed ports 104-105, load ports 106-107, magic tee elements 130-131, hybrid couplers 140-141, links 114-117, low-pass filters 161-165, OMT 170, antenna port 101, and various links 110-121 and 126-129.

Magic tee elements 130-131 comprise waveguide duplexers that, based on a specific geometry, establish impedance matching and isolation among the coupled ports. Magic tees typically include difference ports (E-plane), sum ports (H-plane), and collinear ports. For each magic tee, when the difference and sum ports are simultaneously matched, and (according to symmetry and conservation of energy) the two collinear ports are ‘magically’ matched and isolated from each other. The two collinear ports of each magic tee have split power and phases for each Tx signal polarization, with a first portion of the power split provided to a first hybrid coupler and a second portion of the power split provided to a second hybrid coupler. In this example, the difference ports are coupled to links 126-127 (and feed ports 104-105), sum ports are coupled to links 128-129 (and load ports 106-107), and collinear ports are coupled to links 110-113. For magic tee element 130, when a signal is fed through the difference port (104), outputs of equal magnitude but opposite phase (e.g., 180 degrees out of phase) are provided at the collinear ports (110-111), and the output of the sum port (106) has zero power (ideally). For magic tee 131, when a signal is fed through the difference port (105), outputs of equal magnitude but opposite phase (e.g., 180 degrees out of phase) are provided at the collinear ports (112-113), and the output of the sum port (107) is zero power (ideally). Thus, for the RHCP portion of the Tx signal, a first power split is provided over link 110 to hybrid coupler 140 and a second power split is provided over link 111 to hybrid coupler 141. Likewise, for the LHCP portion of the Tx signal, a first power split is provided over link 112 to hybrid coupler 140 and a second power split is provided over link 113 to hybrid coupler 141.

The particular configuration in system 100 of magic tee elements 130-131 provide a cross-coupled arrangement with respect to hybrid couplers 140-141. Additionally, this arrangement establishes proper summation of the various branches once recombined at OMT 170. Links 110-111 are of length 'A' and links 112-113 are of length 'B', with corresponding lettering of links indicating nominally matched lengths. However, even with nominal lengths being matched, in practice these lengths can vary due to manufacturing tolerances or operational conditions. Magic tees elements 130-131 and links 110-113, with respect to hybrid couplers 140-141, compensate for these length mismatches by providing impedance loads coupled to links 128-129 and load ports 106-107. Impedance loads coupled to load ports 106-107 can dissipate energy/power arising from any minor mismatches in lengths among links 110-113. Advantageously, this automatic length compensation provides for easier manufacturing and assembly, as well as difference port positioning having very tight square-lattice spacing in arrays of such feeds.

From here, hybrid couplers 140-141 are provided which accept signals from the cross-coupled magic tee collinear links 110-113. Hybrid couplers 140-141 take similar phase portions of each of RHCP and LHCP signals and produces an equal division of power into two waveguides/links each (e.g., links 114-117) with 90° separation of phases among the outputs of each hybrid coupler. This variety of hybrid coupler can be referred to as a quadrature hybrid coupler, and the concurrent connection of two input signals to each coupler has the effect of coupling and phase shifting both signals to produce the output signals. Hybrid couplers 140-141 establish signals at the outputs that feed into OMT 170 and produce circular polarization when combined. OMT 170, discussed earlier, receives the four Tx components (having associated phases) from associated Tx branches, and combines or sums these four components into a combined circularly polarized signal for transmission via antenna port 101. Before OMT 170, low pass filters (LPFs) 161-164 are included to block backpropagation of Rx signals into the Tx branches. But for the Tx branches, LPFs 161-164 do not inhibit propagation of the signal components when Tx frequencies are sufficiently below the cutoff frequency. Further details on LPFs 161-164 are discussed below.

Figure 8:
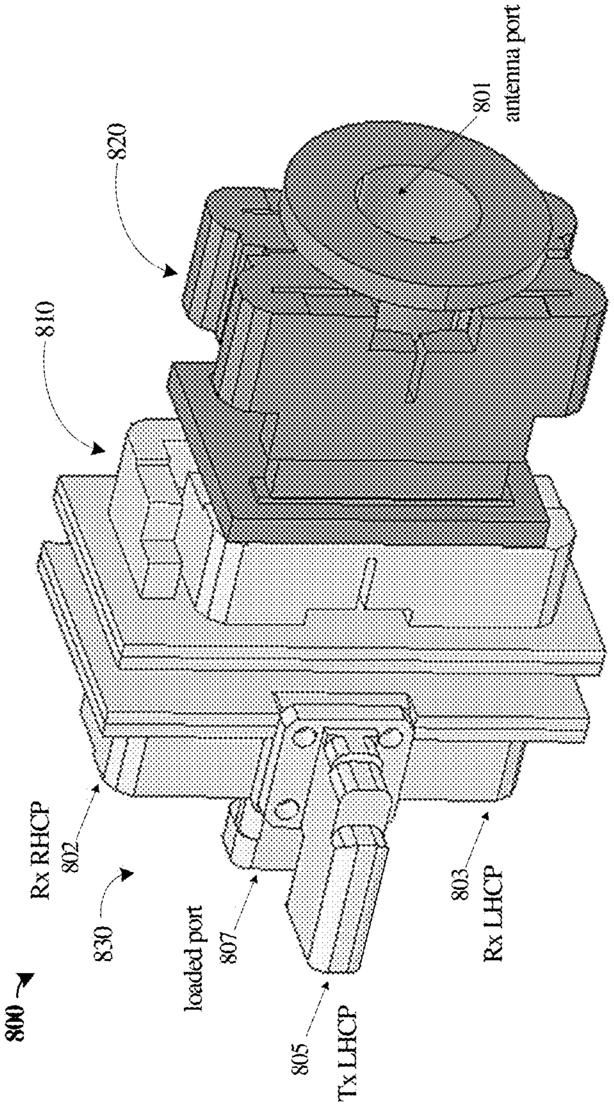
FIG. 8 illustrates a manufactured view of a radio frequency feed in an implementation.

Hybrid couplers 140-141 also provide for an advantageous geometric configuration of system 100, as seen in later Figures. Specifically, the dual-band four-port feed network includes two lower-frequency band H-plane hybrids folded towards the rear of a corresponding assembly. Typically, a quadrature style of hybrid coupler is made of two parallel waveguides and a series of apertures between them. Hybrid couplers 140-141 have a selected geometry and spatial configuration to 'fold' the waveguides through more than one axis backwards with regard to OMT 170 and provide Tx ports on the same longitudinal end of the assembly as that of the Rx ports. In addition, a split plane can be established through each of hybrid couplers 140-141, enabling more advantageous manufacturing options, such as only one portion of system 100 needing to be electroformed. FIG. 8 includes further examples of the split plane arrangement.

Low-pass filters 161-164 include filtering features to inhibit frequencies above a certain cutoff frequency from propagating over links 114-115. Example filtering features include stub resonators or corrugations placed along the length of a waveguide. Thus, LPFs 161-164 can block back-propagation of Rx signals into the Tx network when appropriate frequency bands are selected among Tx and Rx signals. The quantity of corrugations can provide for a selected isolation over the frequency range. In the examples in the following Figures, five (5) corrugations per LPF are included, but it should be understood that different quantities can be included based on attenuation requirements, frequency ranges, and packaging constraints.

Turning now to several waveguide air-cavity example implementations of system 100, FIGS. 2-7 are presented. While elements in FIGS. 2-7 are labeled to indicate elements from FIG. 1 for clarity, it should be understood that variations are possible and these labels do not limit FIGS. 2-7 to the embodiments of FIG. 1. Also, FIGS. 2-7 illustrate air cavity representations of various waveguide-based components for clarity. Manufactured assemblies would be formed from walls having associated air cavities established therein, such as seen in FIG. 8. Various shading is used to highlight different components/elements.

Figure 2:
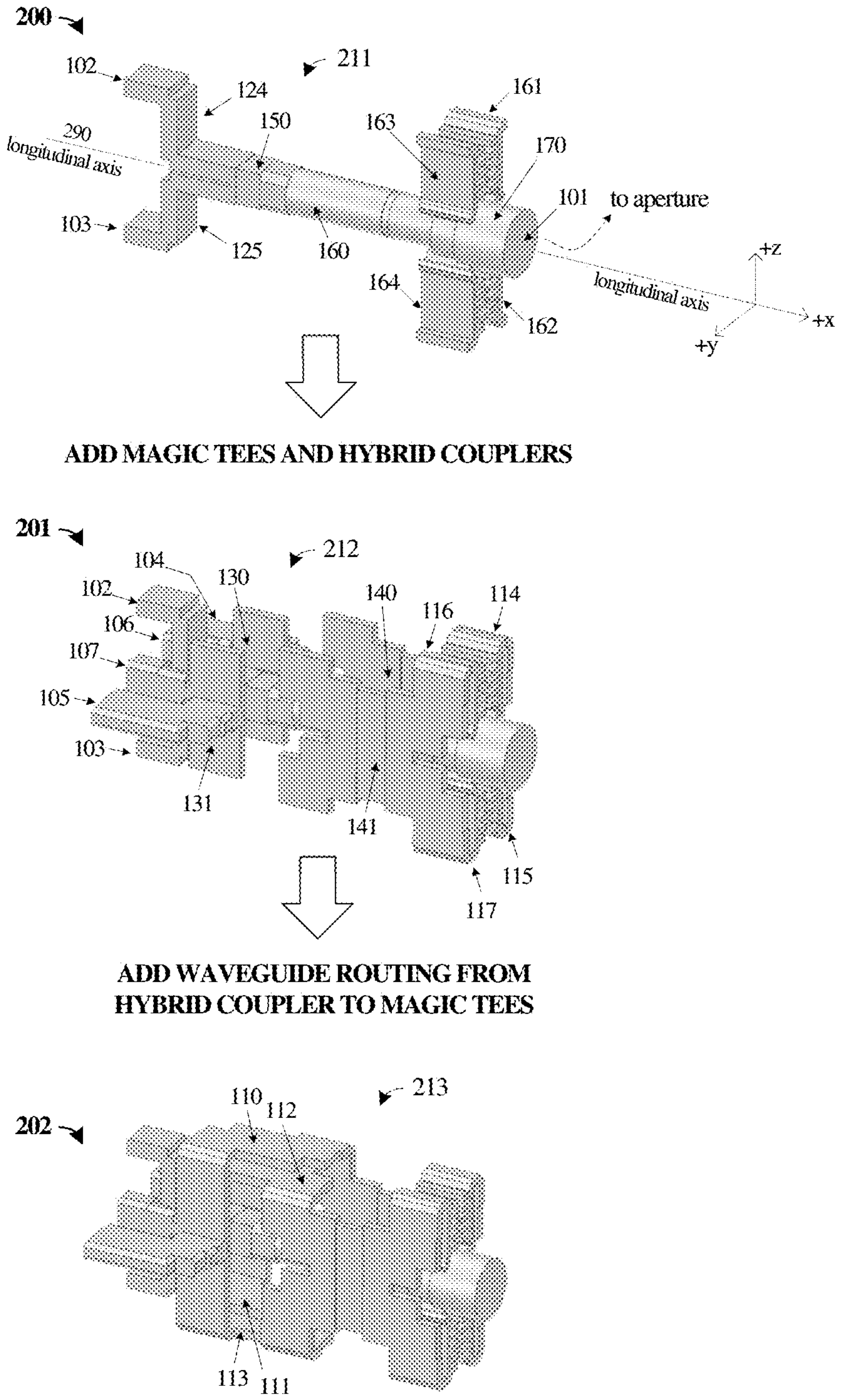
FIG. 2 illustrates sequential views of components of a radio frequency feed in an implementation.

FIG. 2 illustrates isometric views indicating sequential additions of air cavity portions of components that form an assembly, such as the RF feed network comprising system 100 of FIG. 1. An actual manufacturing process need not follow the additions in FIG. 2, and the various views are instead presented to illustrate individual components that form an RF feed network. The sequential additions are employed to highlight the physical/spatial interrelationships between the various components.

In view 200, a first set of elements (211) are established comprising polarizer 150, HPF 160, OMT 170, LPFs 161-164, and ports 101-103. Various links or waveguide sections coupling these elements will be discussed in later Figures. Longitudinal axis 290 is shown, and polarizer 150, HPF 160, and OMT 170 are formed about this shared longitudinal axis. Radially arrayed from longitudinal axis 290 and OMT 170 are four LPFs 161-164. Also radially extending from polarizer 150 are waveguides 124-125 that terminate at feed ports 102-103. In this example, waveguides 124-125 and LPFs 161-164 are arranged in a common plane through longitudinal axis 290.

From here, view 201 illustrates a second set of elements (212) that are established onto the first set (211) seen in view 200. Specifically, magic tee elements 130-131 and hybrid couplers 140-141 are added. These elements are disposed about the existing elements which are formed along longitudinal axis 290, and thus envelop portions of polarizer 150, HPF 160, OMT 170, and LPFs 161-164. As can be seen in view 201, hybrid couplers 140-141 couple to links 114-117 and provide for a compact spatial configuration. Specifically, hybrid couplers 140-141 with links 114-117 are routed back in the "-x" direction from OMT 170 and LPFs 161-164 towards the rear of the second set of elements 212 (i.e., towards the feed ports). Hybrid couplers 140-141 have a selected geometry and spatial configuration to 'fold' the corresponding waveguides through more than one axis (x, z) backwards with regard to OMT 170 and LPFs 161-164. This allows magic tee elements 130-131 to provide Tx ports 104-105 and loaded ports 105-106 on the same longitudinal end of the assembly as that of Rx ports 102-103.

Next, view 202 illustrates a third set of elements (213) that are established onto the first and second set of elements (211, 212) seen in views 200-201. Specifically, cross-coupled waveguides 111-113 are added which couple between hybrid couplers 140-141 and magic tee elements 130-131. The cross-over arrangement uses height differences on branches of hybrid couplers 140-141 to route first ones of the cross-over links underneath or within the extent of second ones. These links are primarily routed into the x-y plane of FIG. 2.

Figure 3:
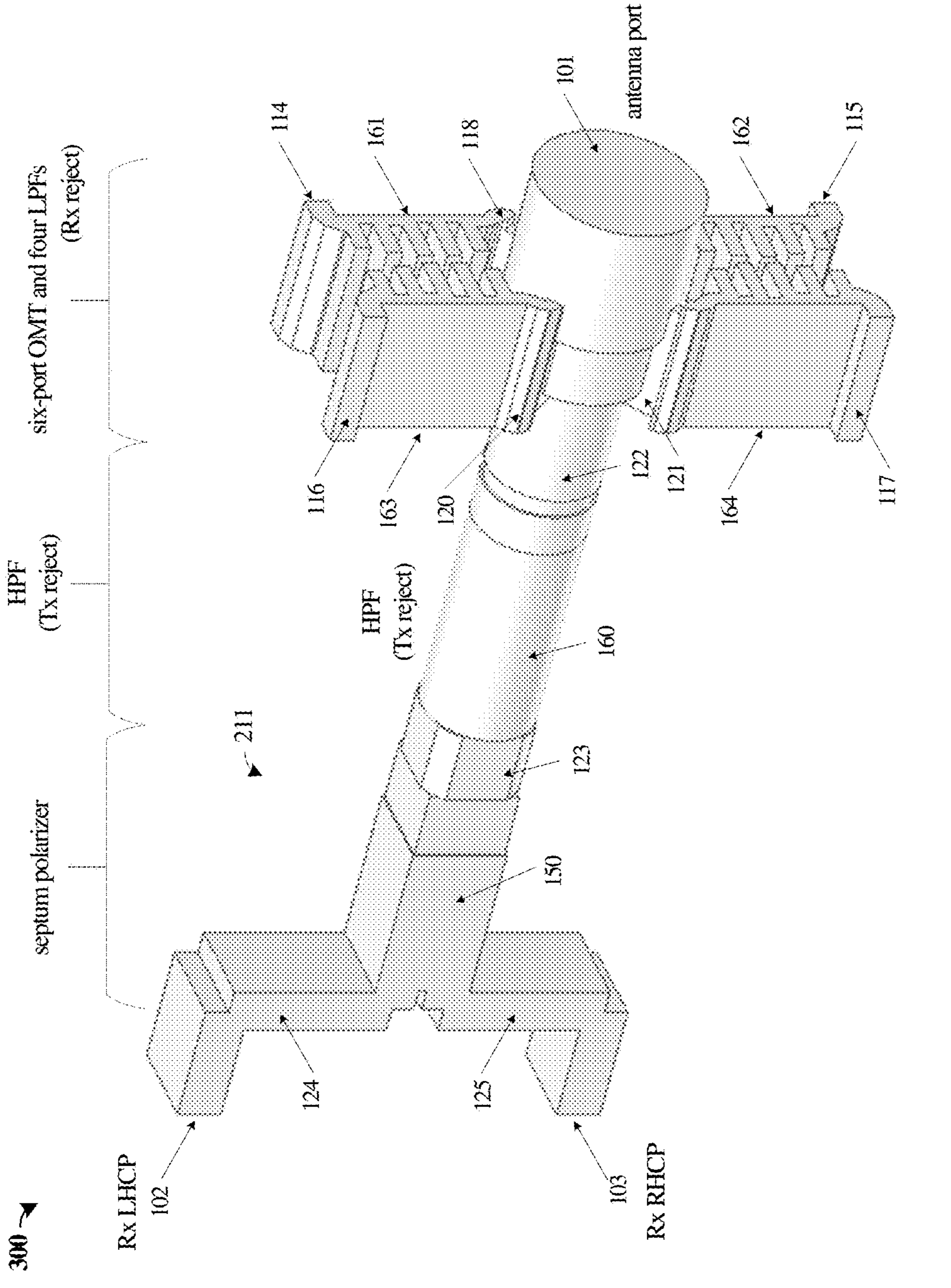
FIG. 3 illustrates an air cavity view of components of a radio frequency feed in an implementation.

FIG. 3 illustrates a more detailed isometric view of the air cavity portions of elements seen in view 201 of FIG. 2. Specifically, view 300 of FIG. 3 includes the first set of elements 211, comprising polarizer 150, HPF 160, OMT 170, LPFs 161-164, and ports 101-103. In this view, links 114-235 are also shown coupling associated components within the shared air cavity. Notably, this view also shows the receive (Rx) pathway of a RF feed network. In receive operations, RF signals are introduced to antenna port 101 from an aperture antenna element. Antenna port 101 feeds the Rx signal to OMT 170 which has several branches. LPFs 161-164 reject/block the Rx signals from traversing into the Tx pathway, and HPF 160 allows the Rx signals to pass over link 123 to polarizer 150. Link 123 also transitions the air cavity cross section from a round or circular cross section of antenna port 101, link 122, OMT 170, and HPF 160 into a square cross section of polarizer 150. Polarizer 150 then splits the Rx signal into two orthogonal polarizations (RHCP, LHCP) and feeds two rectangular waveguides forming links 124-125 and Rx feed ports 102-103.

Figure 4:
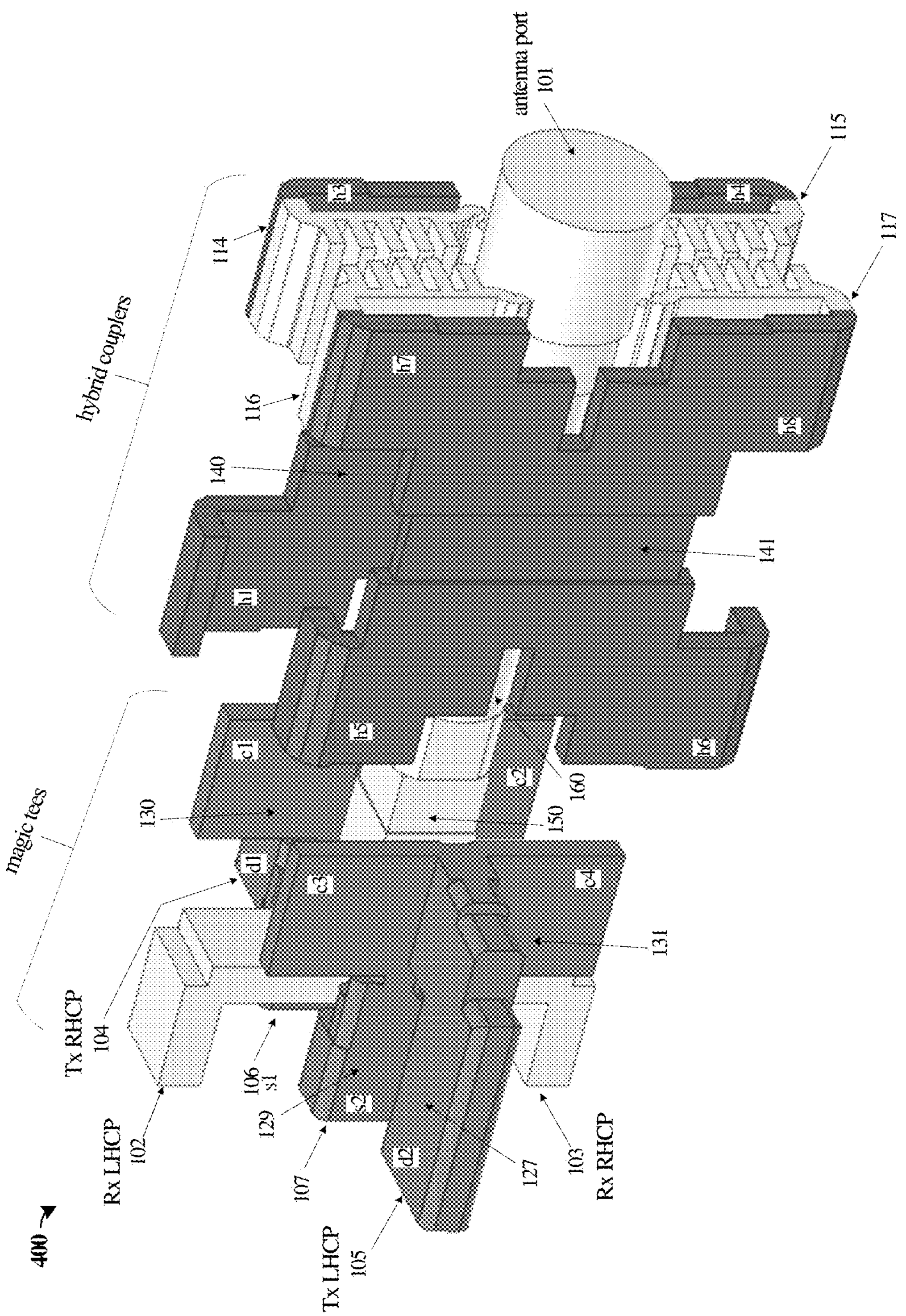
FIG. 4 illustrates an air cavity view of components of a radio frequency feed in an implementation.

FIG. 4 illustrates a more detailed isometric view of the air cavity portions of elements seen in view 202 of FIG. 2. Specifically, view 400 of FIG. 4 includes the first set of elements 211 and adds the second set of elements 212 comprising magic tee elements 130-131 and hybrid couplers 140-141. As can be seen in FIG. 4, various alphanumeric indicators correlate portions of magic tee elements 130-131 and hybrid couplers 140-141 to counterparts in FIG. 1, with some portions hidden from view. Hybrid couplers 140-141 couple via links 114-117 to LPFs 161-164 and are routed to the rear of the assembly towards magic tee elements 130-131. Hybrid couplers 140-141 comprise four port elements, with the ports labeled as h1-h4 and h5-h8. Magic tee elements 130-131 comprise four port elements, with difference (d), sum(s), and collinear (c) ports labeled for each magic tee element (1, 2). Magic tee elements 130-131 provide Tx feed ports 104-105 and load ports 106-107 on a rear of the assembly, and on the same longitudinal end of the assembly as Rx ports 102-103. Advantageously, transmit/receive circuitry can couple on a single longitudinal end of the assembly, with antenna port 101 on an opposite longitudinal end (front) which couples to an aperture antenna element.

Figure 5:
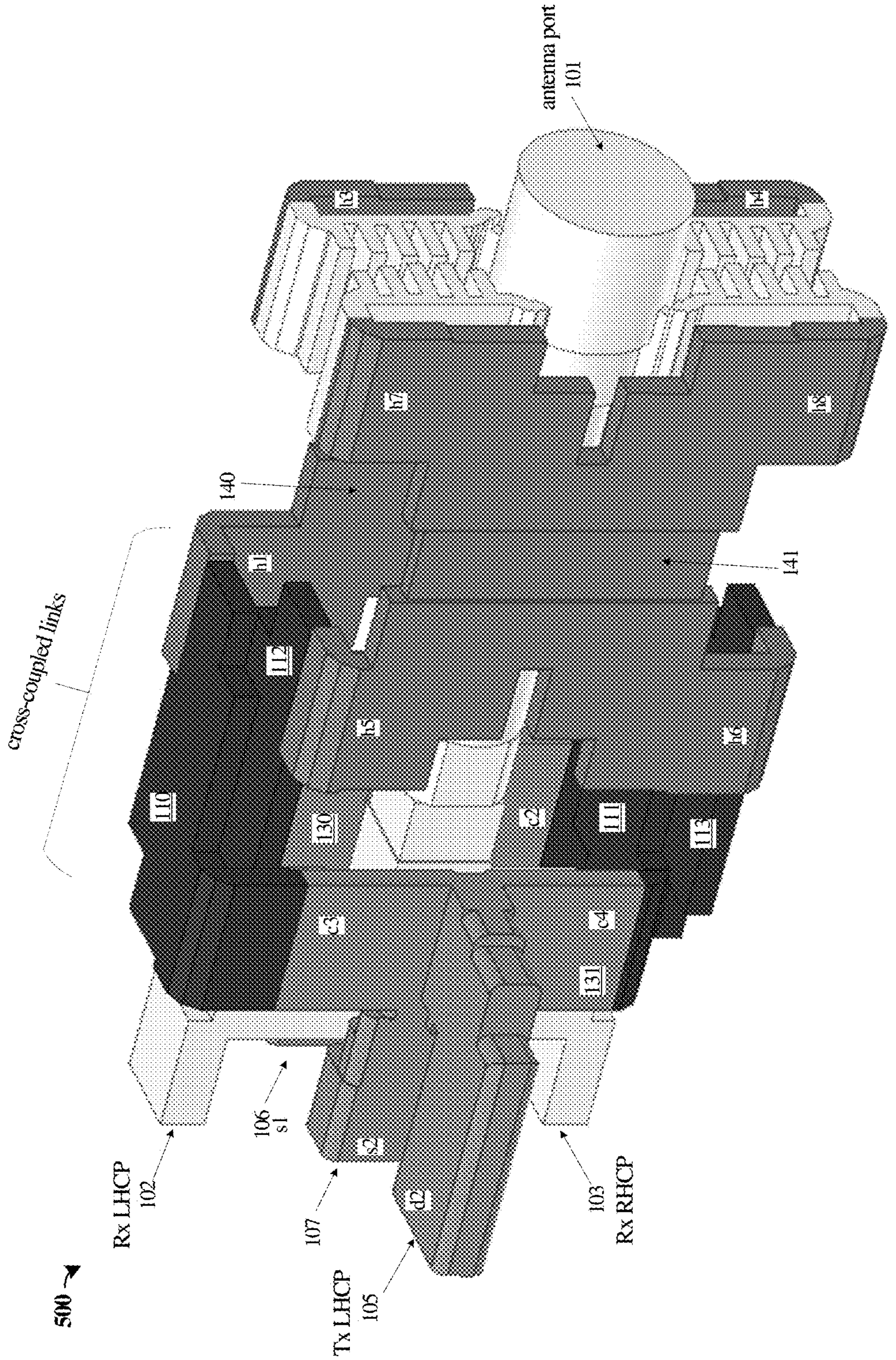
FIG. 5 illustrates an air cavity view of components of a radio frequency feed in an implementation.

FIG. 5 illustrates a more detailed isometric view of the air cavity portions of elements seen in view 203 of FIG. 2. Specifically, view 500 of FIG. 5 includes the first set of elements 211, second set of elements 212, and adds the third set of elements 213 comprising cross-coupled waveguides 111-113 are added which couple between hybrid couplers 140-141 and magic tee elements 130-131. The cross-over arrangement uses height differences on branches of hybrid couplers 140-141 to route first ones of the cross-over links underneath or within the extent of second ones.

Figure 6:
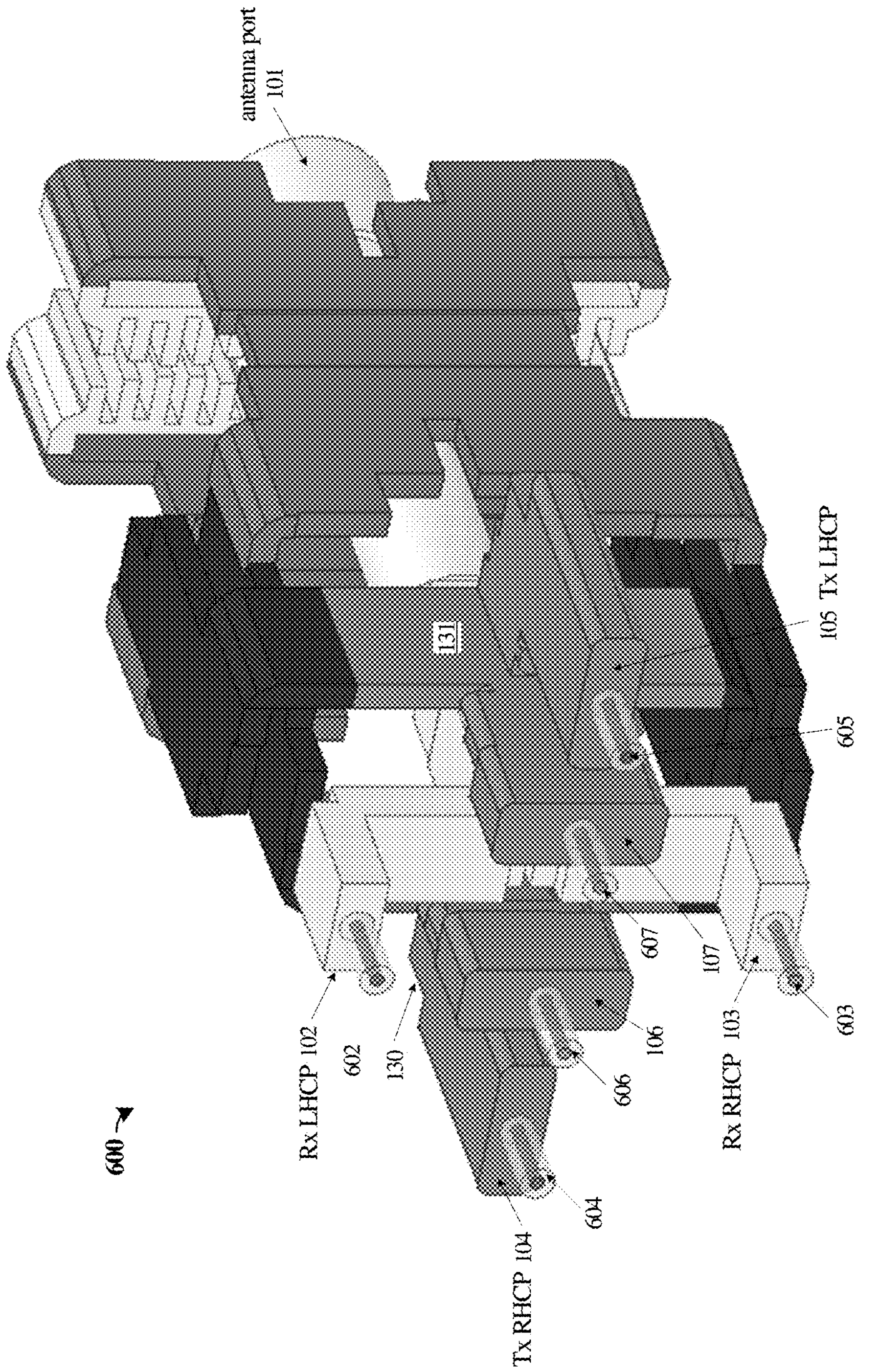
FIG. 6 illustrates an air cavity view of components of a radio frequency feed in an implementation.

FIG. 6 illustrates an isometric rear view 600 of the air cavity portions of elements seen in view 203 of FIG. 2 and of that in FIG. 4, along with additional coaxial feed elements. Specifically, coaxial feed elements 602-607 are included for feed ports 102-105 and load ports 106-107. Coaxial feed elements 602-607 comprise launch elements internal to the corresponding port or waveguide section which receive or transfer RF signals to/from the ports. The launch elements are typically coupled to center conductors of coaxial feed elements 602-607 and can protrude into the air cavity sections of the ports. Shield conductors or outer conductors of coaxial feed elements 602-607 are typically coupled to the outer shell or bulk material forming the air cavities. End caps can be included on each of the ports to conductively seal the waveguides and provide mounting support for coaxial feed elements 602-607. Coaxial feed elements 602-605 then can be coupled over coaxial links to transmit/receive circuitry. Coaxial feed elements 606-607 can be coupled to load elements, such as impedance loads, resistive loads, dummy loads, or other similar elements over coaxial links. Alternatively, instead of coaxial feed elements, waveguides can carry transmit/receive signals to/from feed ports 102-105 and load ports 106-107. When waveguides are employed instead of coaxial links, then various flanges or waveguide couplers can be included to connect the RF feed network to external systems, such as transmit/receive circuitry.

As seen in FIG. 6, the waveguides corresponding to the feed ports and load ports comprise rectangular waveguide cross sections, and these can be sized to mate with external waveguides or have adapters or stepped transitions included to alter the size to fit the corresponding external waveguides. FIG. 6 also shows more clearly the routing/shapes of portions of magic tee elements 130-131 and links 126-128 forming feed ports 102-105 and load ports 106-107. Links 126-128 include stepped transitions and right-angle configurations to route corresponding waveguides to/from magic tee elements 130-131 and to feed ports 102-105 and load ports 106-107. Advantageously, Tx, Rx, and load ports are all routed to a longitudinal end of the RF feed network which is opposite to that of antenna port 101.

Figure 7:
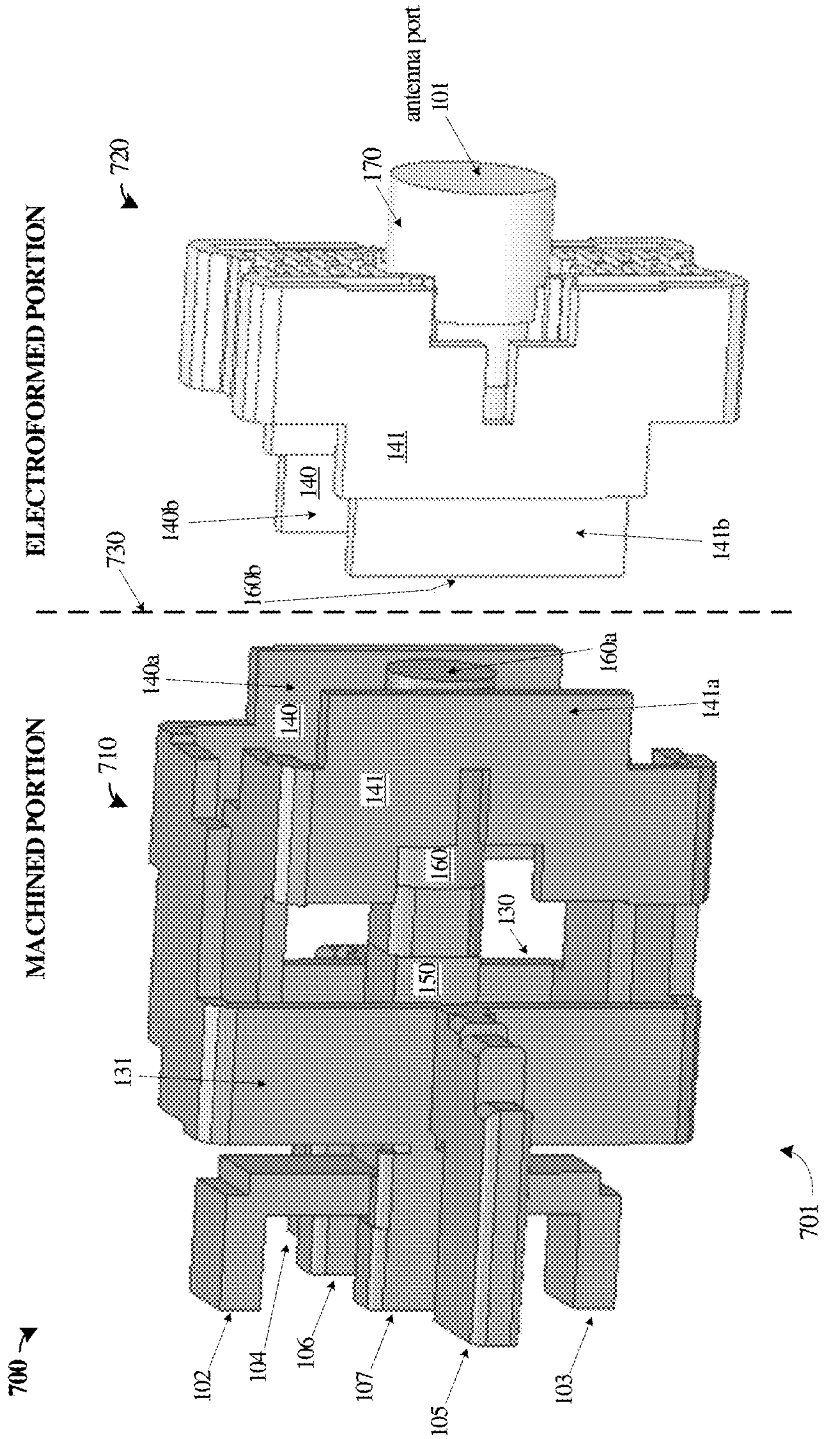
FIG. 7 illustrates an example manufacturing sectioning of a radio frequency feed in an implementation.

FIG. 7 illustrates an example manufacturing sectioning of RF feed network 701 in an implementation. View 700 includes two subassemblies 710 and 720 separated by split plane 730. Split plane 730 can be established through hybrid couplers 140-141 of the Tx pathway and a portion of the Rx pathway. The split plane can be selected to be positioned at portions of the pathways which are less critical for signal integrity. In FIG. 7, hybrid couplers 140-141 are split into two portions each, namely portions 140*a/b* and 141*a/b*. Also, the Rx pathway is split, such as in HPF 160 forming portions 160*a/b* (with 160*b* hidden from view). Alternatively, the Rx pathway can be split at link 122 forming link portions 122*a/b* (not shown in FIG. 7).

This split plane configuration can enable more advantageous manufacturing options, such as only subassembly 720 needing to be electroformed and subassembly 710 manufactured using precision machining or other techniques. The electroform process can produce very precisely manufactured and smooth surfaces which contact RF energy within OMT 170. This can reduce PIM effects and other unwanted parasitic effects like attenuations, reflections, and asymmetries from OMT 170. Various manufacturing techniques can be employed, as mentioned herein, for subassembly 710, such as machining, 3D/additive manufacturing, casting, or electroform techniques, including combinations thereof. However, typically a higher precision manufacturing technique is employed for subassembly 720, such as electroform techniques. Various 3D printing processes can be employed also for subassembly 720 or both of subassemblies 710 and 720. However, many present 3D printing techniques leave rough surfaces, such as from layer lines or sintering processes which require post-processing to smooth. Interior surfaces of air cavities can be difficult to reach with post-processing techniques, and can change the wall thicknesses to alter RF performance unintentionally. In contrast, additive techniques like electroforming can produce smooth surfaces with precision material thicknesses.

FIG. 8 illustrates manufactured view 800 of RF feed 830 in an implementation. While similar elements can be seen in FIG. 8 which are discussed in the other Figures, it should be understood that variations are possible and RF feed 830 is one example manufactured implementation of an RF feed. RF feed 830 also includes a sectioned configuration, having first subassembly 810 and second subassembly 820. First subassembly 810 might be manufactured with machining techniques, and second subassembly 820 might be manufactured with electroforming techniques. As can be seen in FIG. 8, instead of air cavity views from FIGS. 2-7, actual manufactured elements are included. These manufactured elements form walls having internal air cavities forming waveguide structures, filters, polarizers, OMT structures, magic tee elements, couplers, and the like. Also, various external ports are included, such as antenna port 801, Rx ports 802-803, Tx port 804 (Tx port 805 hidden from view), loaded port 806 (loaded port 807 hidden from view).

Figure 9:
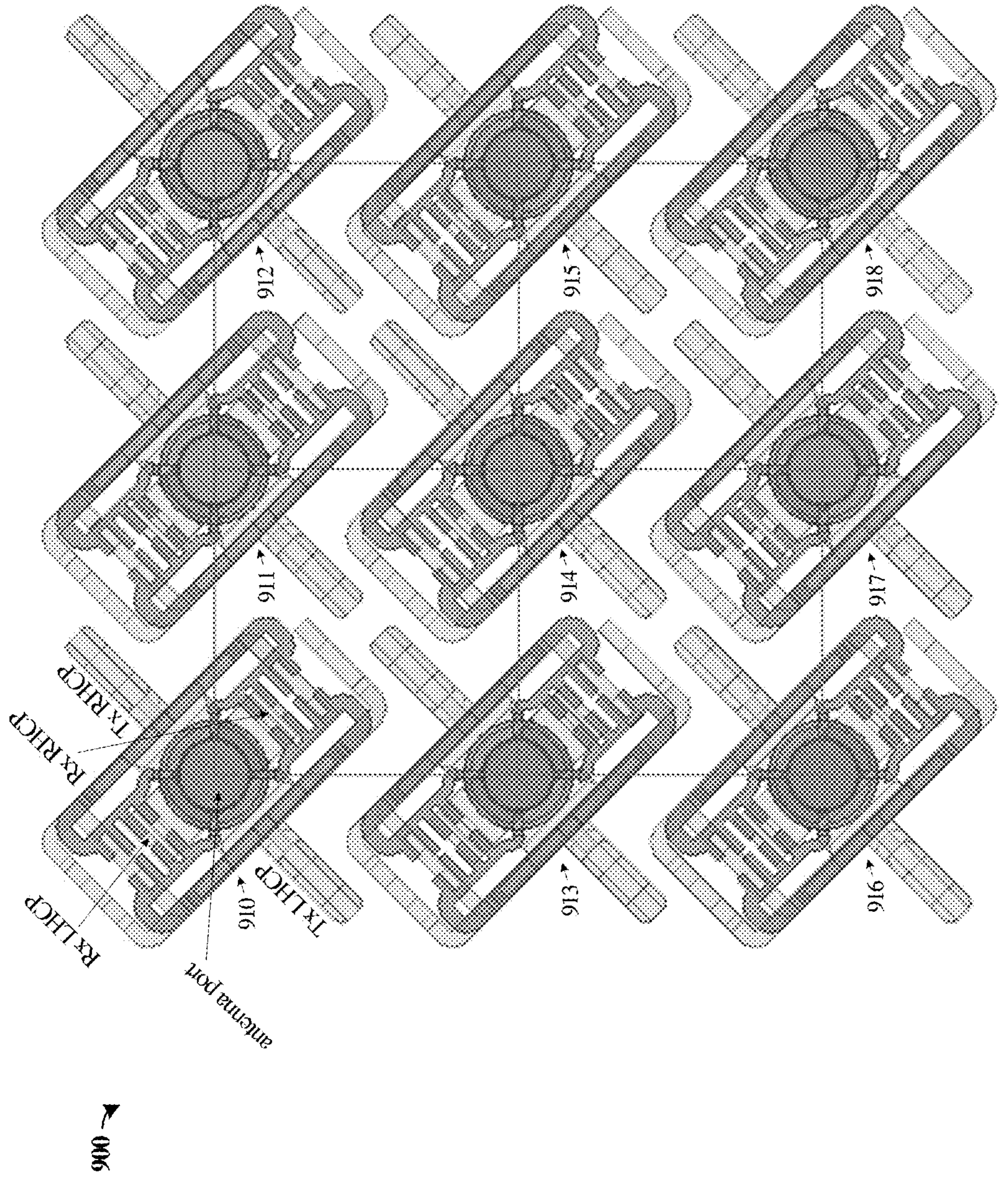
FIG. 9 illustrates an example array configuration with several radio frequency feeds in an implementation.

FIG. 9 illustrates an example array configuration with several radio frequency feeds in an implementation. FIG. 9 illustrates air cavity views of a plurality of RF feed networks 910-918 arranged in a lattice configuration. A large array of RF feed networks can be included in various structures, such as ESAs. Example dimensions include approximately 1.2 inches (+/−0.05 inches) for the grid spacing in FIG. 9. Antenna ports are included in the center of each RF feed network, facing out from the page. Feed ports and load ports are facing into the page. Aperture antennas can be coupled to the antenna ports, forming a space-filling array of antennas fed by feed networks 910-918. The tight packaging of the RF feed networks is enabled by the enhanced structures discussed herein, such as the rear-folded hybrid couplers, radial low-pass filters, and central longitudinal axis housing the Rx pathway elements. Also of note are positioning of difference ports (e.g., Tx LHCP and Tx RHCP) on corresponding magic tee elements within the feeds establish very tight square-lattice spacing. Advantageously, large arrays of many dozens or hundreds of RF feeds and antenna elements can be formed using the elements and techniques discussed herein.

The examples discussed herein comprise waveguide-based dual polarization circularly polarized (CP) feed structures supporting concurrent Rx and Tx operation in a compact packaging envelope. Also discussed herein are various manufacturing techniques for communication applications with a compact equipment envelope and low mass. Moreover, various manufacturing techniques can be employed, including machining, electroforming, injection molding, or 3D printing, among others. In the examples herein, a combination of manufacturing techniques can be employed to form the entire RF feed structure in two workpieces which are later joined/mated at a split plane. A first workpiece can be formed using machining techniques, while a second workpiece can be formed using electroforming techniques. Electroforming techniques employ a mandrel to establish a base shape onto which material is electrochemically deposited, with the mandrel removed from the deposited material after completion. In other examples, additive or 3D printing might form the entire structure in a single workpiece. However, some additive manufacturing techniques provide too rough of a workpiece surface for the microwave RF frequencies involved, which requires post-processing to smooth the internal waveguide features sufficiently to prevent reflections, attenuations, PIM, or other parasitic effects. Also, when injection molding or casting techniques are employed to manufacture structures, draft angles can be included to slope cross-sectional areas along certain axes. These draft angles are typically a requirement of the manufacturing tooling or process to prevent material overhangs or parallel surfaces in order to release the workpiece from a mold or die.

Antenna ports can utilize a circular cross-sectional aperture shape with the feed ports comprising a rectangular cross-sectional shape. It should be understood that other cross-sectional shapes, such as a square, triangular, hexagonal, or irregular can be employed using similar techniques discussed herein. Also, flanges used for connections or bolting among various components of an RF system are shown in some of the examples herein. It should be understood that these flanges can be omitted or altered to suit the particular application. Aperture antenna elements, such as horn antennas, which are coupled to antenna ports can comprise various shapes of horn, such as circular, rectangular, square, triangular, hexagonal, or irregular.

Materials employed for the elements of the waveguide structures discussed herein can include any machinable and conductive material, such as aluminum, magnesium alloys, silver, gold, copper, and other suitable metals or metal allows. Non-conductive materials can be employed if RF-contacting surfaces are coated or treated with conductive layers, such as copper, aluminum, silver, gold, or similar plating. In the alternative, injection-moldable materials can be used, such as plastics, polymers, carbon composites, polyamide, acrylic, polycarbonate, polyoxymethylene, polystyrene, acrylonitrile butadiene styrene (ABS), polypropylene, polyethylene, polyurethane, thermoplastic rubber, including combinations thereof. Additionally, various additives can be included in the injected material, such as stabilizers, glass or organic fibers, structural elements, lubricants, mold release agents, or other additives. The material can be injected via at least one port into a mold or die which forms the shapes and cavities of the associated elements. Once formed, conductive surface treatments are typically applied at least to surfaces in contact with RF signals. These conductive surface treatments include various platings, including conductive materials, metallic substances, metals, metal alloys, and the like, such as those mentioned above including aluminum, copper, silver, gold, or other similar metals or associated combinations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:
a septum polarizer having first feed ports and a common port;
a high-pass filter coupled to the common port of the septum polarizer;
a multi-port orthomode transducer (OMT) coupled to the high-pass filter and providing an antenna port;
hybrid couplers coupled to low-pass filters fed from the multi-port OMT; and
magic tee elements cross-coupled to the hybrid couplers and providing second feed ports.

2. The apparatus of claim 1, comprising:
the septum polarizer, the high-pass filter, the antenna port, and the multi-port OMT comprising waveguide structures formed along a longitudinal axis;
the low-pass filters arranged radially from the multi-port OMT; and
the hybrid couplers and the magic tee elements arranged about the septum polarizer, the high-pass filter, the antenna port, and the multi-port OMT to position the first feed ports and the second feed ports on a first longitudinal end and the antenna port on a second longitudinal end.

3. The apparatus of claim 2, wherein the hybrid couplers and the magic tee elements arrange corresponding waveguide structures in a reverse longitudinal direction in relation to the septum polarizer, the high-pass filter, the antenna port, and the multi-port OMT.

4. The apparatus of claim 2, wherein the septum polarizer, the high-pass filter, the multi-port OMT, the hybrid couplers, the low-pass filters, and the magic tee elements comprise a shared waveguide cavity space.

5. The apparatus of claim 1, comprising:
a first assembly comprising a first unified cavity forming the septum polarizer, a first portion of the high-pass filter, the magic tee elements, the first feed ports, the second feed ports, and a first portion of the hybrid couplers;
a second assembly comprising a unified merged cavity forming the multi-port OMT, the antenna port, a second portion of the high-pass filter, and a second portion of hybrid couplers; and
a split plane forming a joint between the first assembly and the second assembly through the high-pass filter and the hybrid couplers that when joined forms a joined waveguide cavity space comprising the first unified cavity and the second unified cavity.

6. The apparatus of claim 5, wherein the first assembly is manufactured using a different manufacturing technique than the second assembly.

7. The apparatus of claim 1, comprising:
the magic tee elements each comprising 4-port waveguide couplers providing colinear ports cross-coupled to the hybrid couplers, sum ports configured to couple to radio frequency load elements, and difference ports coupled to coaxial launch elements that provide orthogonally polarized signals to or from radio frequency circuitry.

8. The apparatus of claim 1, comprising:
a first feed network comprising the antenna port, the multi-port OMT, the high-pass filter, the septum polarizer, and the first feed ports;
a second feed network comprising the second feed ports, the magic tee elements, the hybrid couplers, the low pass filters, the multi-port OMT, and the antenna port.

9. The apparatus of claim 1, wherein when configured in a first communication endpoint configuration, the first feed ports comprise orthogonally polarized receive ports, and the second feed ports comprise orthogonally polarized transmit ports; and
wherein when configured in a second communication endpoint configuration, the first feed ports comprise orthogonally polarized transmit ports, and the second feed ports comprise orthogonally polarized receive ports.

10. The apparatus of claim 1, comprising:
an antenna aperture coupled to the antenna port and configured to transmit and receive radio frequency signals.

11. The apparatus of claim 1, wherein the hybrid couplers comprise quadrature hybrid waveguide couplers configured to split power among a set of ports; and
wherein the magic tee elements each comprise 4-port waveguide couplers.

12. The apparatus of claim 1, comprising:
coaxial link connectors coupled to the first feed ports, the second feed ports, and sum ports of the magic tee elements.

13. A method, comprising:
forming a first assembly comprising a first unified cavity having:
a septum polarizer with first feed ports and a common port;
a first segment of a high-pass filter coupled to the common port of the septum polarizer;
first segments of hybrid couplers; and
magic tee elements comprising difference ports providing second feed ports, sum ports, and co-linear ports cross-coupled to the first segments of the hybrid couplers;
forming a second assembly comprising a second unified cavity having:
a second segment of the high-pass filter;
second segments of the hybrid couplers;
low-pass filters coupled to second segments of the hybrid couplers;
an antenna port; and
a multi-port orthomode transducer (OMT) coupled to the second segment of the high-pass filter, the low-pass filters, and the antenna port; and
joining the first assembly to the second assembly to form a joined cavity.

14. The method of claim 13, comprising:
forming the septum polarizer, the high-pass filter, the antenna port, and the multi-port OMT as waveguide structures aligned along a longitudinal axis;
forming the low-pass filters arranged radially from the multi-port OMT; and
forming the hybrid couplers and the magic tee elements arranged about the septum polarizer, the high-pass filter, the antenna port, and the multi-port OMT to position the first feed ports and the second feed ports on a first longitudinal end and the antenna port on a second longitudinal end.

15. The method of claim 14, wherein the hybrid couplers and the magic tee elements arrange corresponding waveguide structures in a reverse longitudinal direction in relation to the septum polarizer, the high-pass filter, the antenna port, and the multi-port OMT.

16. The method of claim 13, comprising:

a split plane forming a joint between the first assembly to the second assembly through segments of the high-pass filter and segments of the hybrid couplers.

17. The method of claim 13, wherein the first assembly is manufactured using a different manufacturing technique than the second assembly.

18. The method of claim 13, wherein when configured in a first communication endpoint configuration, the first feed ports comprise orthogonally polarized receive ports, and the second feed ports comprise orthogonally polarized transmit ports; and wherein when configured in a second communication endpoint configuration, the first feed ports comprise orthogonally polarized transmit ports, and the second feed ports comprise orthogonally polarized receive ports.

19. The method of claim 13, comprising:

coupling coaxial link connectors to the first feed ports, the second feed ports, and the sum ports.

20. A waveguide cavity structure, comprising:

a septum polarizer with first feed ports and a common port;

a high-pass filter coupled to the common port of the septum polarizer;

a multi-port orthomode transducer (OMT) coupled to the high-pass filter and providing an antenna port;

hybrid couplers coupled to low-pass filters fed from the multi-port OMT; and magic tee elements cross-coupled to the hybrid couplers and providing second feed ports and sum ports.

* * * * *